Dec. 31, 1963    C. O. GLASGOW    3,116,094
SPARE WHEEL CONSTRUCTION
Filed Feb. 12, 1962

INVENTOR.
CLARENCE O. GLASGOW
BY
Dunlap, Laney & Hubbard
ATTORNEYS

United States Patent Office 3,116,094
Patented Dec. 31, 1963

1

3,116,094
SPARE WHEEL CONSTRUCTION
Clarence O. Glasgow, 2620 S. Yorktown, Tulsa, Okla.
Filed Feb. 12, 1962, Ser. No. 172,404
6 Claims. (Cl. 301—38)

The present invention relates to automobiles, and more particularly, but not by way of limitation, relates to a spare wheel construction for automobiles.

As is well known in the art, almost all automobiles presently in use carry an extra or spare wheel and tire in the trunk in the event one of the four tires being used becomes flat. Most automobiles in this country run on wheels each comprised of a hub which rotates on an axle and has a number of stud bolts for connecting a wheel, with a pneumatic tire thereon, to the rotating hub. The spare wheels and tires presently in use are universally of the same construction as the four wheels and tires used at all times for driving. Yet, in most cases the spare tire is not used for great periods of time, sometimes not for years, and when it is used, it is only for a brief time until the other tire can be repaired.

The combination spare wheel and tire are quite heavy and bulky, and represent a considerable expense in the initial purchase of the automobile. The wheel and tire structure occupies considerable space in the trunk of the car, space which in the current trend toward smaller, compact cars becomes increasingly scarce and valuable. Various types of special storage compartments are provided in the trunks of the automobiles for receiving the spare tires in such a manner as to occupy a minimum of space. However, these special compartments, which are usually in the form of a well, are invariably exceedingly inconvenient in their location and usually require a Herculean effort on the part of many people to remove the tire and wheel from the trunk. Once the tire and wheel have been removed from the trunk, the substantial weight and bulkiness of the combination makes it exceedingly difficult for some people, particularly older people and women, to replace a flat tire with the spare.

Therefore, it is contemplated by the present invention to provide a spare wheel for an automobile comprised of a plurality of spoke members for connection to the rotating hub of the vehicle, and a plurality of rim segments for connection between the adjacent spoke members to form a circular rim for contacting the road surface. When the spare wheel is not in use, the wheel may be disassembled and bundled in a compact package for convenient storage in the trunk.

Therefore, it is an important object of this invention to provide a spare wheel for an automobile which occupies a minimum amount of space when stored in the trunk of the automobile.

Another object of this invention is to provide a spare wheel for an automobile which may be applied to the hub of the automobile without the lifting of any heavy parts.

Yet another object of the present invention is to provide a spare wheel for an automobile which is very inexpensive.

Still another object of the present invention is to provide spoke members for a spare wheel of the type described which may be economically produced, are lightweight, are very strong, and which may be nestled one within the other to form a compact package for storage in the automobile trunk.

Still another object of this invention is to provide a novel rim segment structure for cooperative engagement with the novel spoke members which may also be nestled in a compact bundle for storage in the trunk of an automobile.

2

Many additional objects and advantages will be evident from the following detailed description and drawings wherein.

Figure 2:
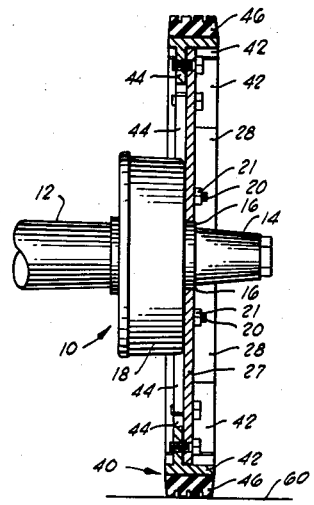
FIG. 2 is a sectional view taken substantially on lines 2—2 of FIG. 1.
Figure 1:
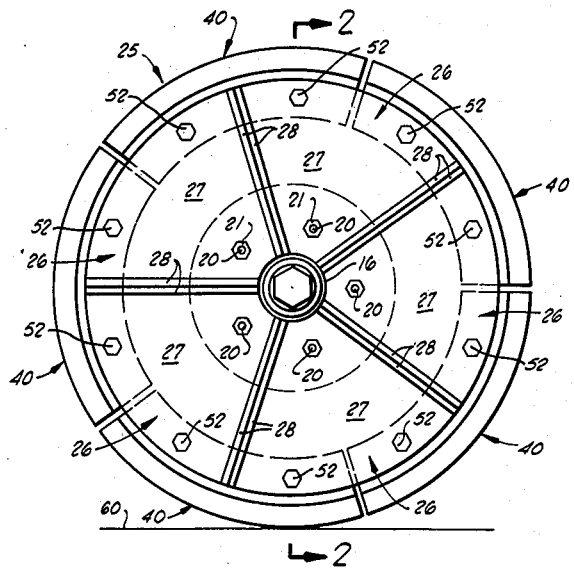
FIG. 1 is a side view of a spare wheel constructed in accordance with the present invention.
Figure 3:
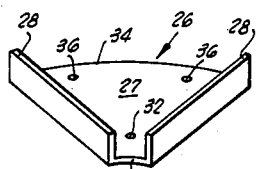
FIG. 3 is a perspective view of a spoke member of the wheel illustrated in FIG. 1.
Figure 4:
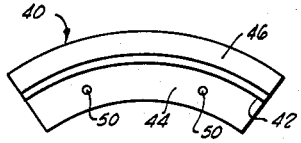
FIG. 4 is a side view of a rim segment of the wheel illustrated in FIG. 1.

Referring now to the drawings, and in particular to FIGS. 1 and 2, a conventional hub, indicated generally by the reference numeral 10, is rotatably mounted on an axle 12 of a standard automobile. The hub 10 is comprised generally of a rotating bearing housing 14 having a standard, slightly tapered, circumferential shoulder 16. A brake drum 18 is rigidly connected to the rotating bearing housing 14 and may house the conventional braking mechanism for the particular wheel of the automobile illustrated. Five threaded stud bolts 20 are connected to the drum 18 at circumferentially spaced points, as best seen in FIG. 1, and extend from the hub 10 generally parallel to the axis of rotation of the housing 14, and in combination with a like number of nuts 21 comprise the means for attaching a conventional wheel to the hub 10. Of course, it will be appreciated, and is to be understood, that the number of threaded studs 20 may vary widely, depending upon the particular make and model of automobile. Similarly, the threaded studs 20 may in some instances be in the form of threaded bolts which are threaded into tapped bores in the drum 18 to provide the means for securing a wheel on the hub 10 in a manner which is well known in the art. In any event, the structure heretofore described is conventional and forms a part of the standard automobile, and it should be understood that a wheel constructed in accordance with the present invention may be adapted for application to any of the standard automobile hubs.

The novel wheel construction in accordance with the present invention is indicated generally by the reference numeral 25. The wheel comprises, in the embodiment described, five spoke members 26. However, it is to be understood that the number of spoke members 26 will preferably correspond to the number of threaded studs 20, or similar fastening means, as described, which are provided on the standard hub 10. The spoke members 26 are preferably of identical construction and each may comprise a flat plate 27 which is shaped generally like a piece of pie, or geometrically speaking, is a sector of a circle. The plate 27 has flanges 28 disposed at right angles to the plate 27 and extending along the radial edges thereof. The inner edge 30 of the plate 27 is arcuately shaped to uniformly engage the circumferential shoulder 16 of the housing 14. An aperture 32 is provided to receive one of the threaded stud bolts 20 for fastening the spoke member 26 to the hub 10. The aperture 32 is preferably spaced from the arcuate edge 30 such that when one of the stud bolts 20 is inserted in the aperture 32 and a nut 21 tightened thereon, the edge 30 will be tightly wedged against the shoulder 16. The outer edge 34 of the plate 27 is also arcuate in shape, and a pair of apertures 36 are spaced apart one from the other substantially as shown, and are also spaced from the edge 34 a distance such as will hereafter be described in greater detail. The spoke members 26 are preferably fabricated from an aluminum alloy in order to provide a lightweight, yet strong structure, and may be fabricated in any suitable manner such as by stamping or die casting.

Figures 5, 6, 7:
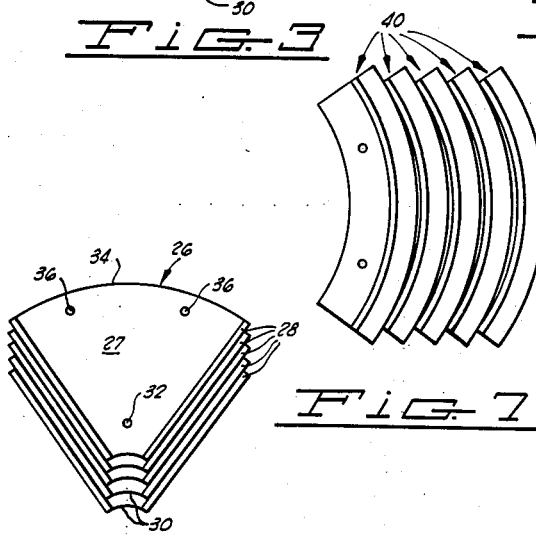
FIG. 5 is an enlarged sectional view, similar to FIG. 2, showing in greater detail the construction of the wheel illustrated in FIG. 1.
FIG. 6 is a view showing the five spoke members of the wheel illustrated in FIG. 1 nestled one within the other for storage; and, FIG. 7 is a side view showing the five rim segments of the wheel illustrated in FIG. 1 nestled one within the other for storage.

The wheel 25 is further comprised, in the embodiment described, of five rim segments, each indicated generally by the reference numeral 40. However, it is to be understood that the number of rim segments 40 will usually correspond to the number of spoke members 26. The rim segments 40, when assembled in the wheel, are arranged substantially as shown in FIG. 1. It will be noted that each rim segment 40 extends between and interconnects two adjacent spoke members 26. Each of the rim segments 40 is arcuate in shape and of such a length that when the rim segments are connected to the spoke members 26 as shown the five rim segments 40 will form a complete circular wheel. Each rim segment 40 is comprised of an arcuate metallic band 42 having an integral, inwardly projecting radial flange 44, and a molded rubber tire segment 46, as best seen in the cross sectional views of FIGS. 2 and 5. It will be noted that the radial flange 44 is spaced from the center of the arcuate band 42 a distance corresponding to the width of the pie-shaped center plate 27 of a spoke member 26. This construction aligns the center plate 27 of the spoke member 26 directly in the center of the rim segment 40 to better support a load applied to the resilient rubber tire segment 46. The resilient rubber tire segment 46 is substantially coextensive with the semicircular band 42 and may be bonded thereto by any conventional method, preferably by molding. The tire segment 46 is preferably molded from butyl rubber and may have a cross sectional shape substantially as best illustrated in FIG. 5 wherein treads 48 are formed around the periphery thereof in the same manner that treads are provided on a more conventional pneumatically inflated tire. A pair of tapped apertures 50 are provided in the radially extending flange 44 and are spaced apart substantially as illustrated to register with the adjacent apertures 36 on two adjacent spoke members 26. A threaded bolt 52 may then be passed through each of the apertures 36 in the adjacent spoke members 26 and be threaded into the tapped bores 50 for connecting the rim segment 40 to the respective spoke members. It will be noted from FIG. 5 that the aperture 36 in the plate 27 is slightly larger than the shank of the bolt 52 and is so spaced relative to the tapped bore 50 as to permit the edge 34 of the plate 27 to abut against the band 42 of the rim segment 40.

In order to attach the wheel device 25 to the hub 10, assume for a starting point that the spoke members 26 and the rim segments 40 are completely disassembled. The spoke members 26 may then be connected, one at a time, to the hub 10 by inserting the stud bolts 20 into the apertures 32 and tightening a nut 21 on the bolt. The inner arcuate edge 30 of the spoke member 26 will then be in contact with the circumferential shoulder 16 and against the face of the drum 18.

After all five of the spoke members 26 have been so connected to the hub 10, the rim segments 40 may be connected, one at a time, to the spoke members 26 by positioning the radial flanges 44 behind the plate 27 of the spoke members 26 and aligning the tapped bores 50 with the adjacent apertures 36 in two adjacent spoke members 26. The threaded bolts 52 may then be inserted through the apertures 36 and threaded into the tapped bores 50. As mentioned, the arcuate band 42 of the rim segment 40 rests on the arcuate outer edge 34 of the plates 27 respective spoke members 26. Since the apertures 36 in the spoke members 26 are slightly larger than the shank of the threaded bolt 52, the semicircular band 42 will always be permitted to rest on the edge 34 of the spoke member 26.

Therefore, it will be noted that the load of the automobile on the axle 12 is transmitted substantially through the circumferential shoulder 16 to the arcuate edge 30 of the pie-shaped plate 27 of the spoke members 26, then through the arcuate edge 34 of the plate 27 to the arcuate band 42 of the rim segment 40, and then through the solid rubber tire segment 46 to the ground 60, as best seen in FIG. 2. Of course, the stud bolts 20 may also share in supporting the load placed on the rim segments 40, either through compression of the lower spoke members or tension in the upper spoke members, as the case may be. In any event, it will be noted that the center of force on the tire segment 46 is exactly aligned with the shoulder 16.

Lateral stresses on the wheel 25 caused by turning or similar maneuvers of the automobile will be effectively resisted by the flanges 28 extending along the radial edges of the plate 27 which effectively stiffen the spoke members 26 in the conventional manner that flanges stiffen a channel beam. In this regard it will be noted that maximum lateral bending movement will be applied to the spoke members 26 at the apertures 32 where the respective spoke members are connected to the drum 18 by the stud bolts 20. It will also be noted that the spacing between the flanges 28 is at a minimum in the area between the apertures 32 and the inner edges 30 and therefore the spoke members 26 have a maximum strength at the point of maximum stress.

When the wheel 25 is completely disassembled and disconnected from the hub 10, the spoke members 26 may be nestled one within the other, substantially as shown in FIG. 6. Similarly, the five rim segments 40 may be nestled one within the other, substantially as shown in FIG. 7. A cloth sack (not shown) may be provided for conveniently storing the ten threaded bolts 52. The nestled spoke members 26 and the nestled rim segments 40 together with the sack filled with the bolts 52 may be bundled together in a single package which is very small in size and which may be conveniently stored in the trunk of an automobile. Since both the spoke members 26 and the rim segments 40 are preferably fabricated from an aluminum alloy, the entire package containing the disassembled wheel 25 will be relatively lightweight and may easily be removed from the trunk. In the event of a flat tire, it is a very simple matter to remove the flat tire and connect the very lightweight spoke members 26 and rim segments 40, one at a time, to the hub 10 to simultaneously assemble and apply the spare wheel which will suffice while driving the automobile to the nearest service station where the flat may be repaired. However, during the periods when the spare wheel is not in service it may conveniently be stored in the trunk without occupying any appreciable space. Further, the initial cost of the spare tire which is seldom used is greatly reduced.

Having thus described a preferred embodiment of the invention, it is to be understood that various changes and substitutions can be made therein without departing from the spirit and scope of the invention as defined by the appended claims.

I claim:

1. A wheel for a vehicle comprising a rotating hub having a plurality of bolt fastening means thereon for connecting a wheel to the hub, a number of spoke members corresponding to the number of bolt fastening means on the rotating hub, each spoke member comprising a plate having an inner edge positioned adjacent the hub and an arcuately shaped outer edge;

aperture means in the plate adjacent the inner edge thereof for receiving one of the bolt fastening means for connecting the plate to the hub;

a number of rim segments corresponding to the number of spoke members, each rim segment being arcuate in shape and having an inner radius of curvature corresponding to the arcuately shaped outer edge of the respective plates, each rim segment being of sufficient length that all of the rim segments together will form substantially a complete, circular rim; and means for connecting each rim segment to the arcuately shaped outer edges of two adjacent spoke members whereby the rim segments will interconnect each two adjacent spoke members and will form a circular wheel.

2. A wheel for a vehicle as defined in claim 1 wherein: each of the spoke members comprises a plate having generally the shape of a sector of a circle, the plate having a reinforcing flange extending along each of the radial edges thereof corresponding to radii of the circle, an arcuately shaped inner edge generally adjacent the apex of the sector having a radius of curvature corresponding to that of the shoulder on the rotating hub, and bearing thereon, and an arcuately shaped outer edge.

3. A wheel for a vehicle as defined in claim 1 wherein: each of the rim segments comprises an arcuate band having an outer surface and an inwardly directed radial flange, and an arcuately shaped body of rubber connected to the outer surface of the arcuate band.

4. A wheel for a vehicle as defined in claim 3 wherein: the means for connecting each rim segment to the arcuately shaped outer edges of two adjacent spoke members comprises threaded apertures in the radial flanges of the rim segments, apertures in the spoke members registering with the threaded apertures, and threaded bolt means passing through the apertures in the spoke members and threaded into the threaded apertures in the radial flanges.

5. A spare wheel for an automobile having a rotating hub with a circumferential load-bearing shoulder and a plurality of bolt fastening means thereon for connecting a wheel to the hub, the spare wheel comprising:

a number of spoke members corresponding to the number of bolt fastening means on the rotating hub, each spoke member comprising a plate having the general shape of a sector of a circle, the plate having an arcuately shaped inner edge disposed generally adjacent the apex of the sector, the inner edge having a radius of curvature corresponding to that of the circumferential load-bearing shoulder for contact with the shoulder, the plate having an arcuately shaped outer edge;

the plate having a reinforcing flange extending along each of the radial edges of the plate which corresponds to the radii lines of the sector, first aperture means in the plate adjacent the inner edge for receiving one of the bolt fastening means for connecting the spoke member to the hub, second aperture means comprised of at least two apertures in the plate adjacent the outer edge thereof, a number of rim segments corresponding to the number of spoke members, each rim segment being arcuate in shape and having an arcuate length sufficient that the rim segments, taken together, will form a complete circular rim, each rim segment having an arcuately shaped band having an inner radius of curvature corresponding to the radius of curvature of the arcuately shaped outer edges of the plates of the spoke members, the band engaging a portion of the outer arcuately shaped edges of two adjacent spoke members, each rim segment having a radially inwardly extending flange connected to the arcuately shaped band, each rim segment having an arcuately shaped tire segment connected to the outer edge of the arcuately shaped band, threaded aperture means in the radially inwardly extending flange, the threaded aperture means registering with the second aperture means in the plates of two adjacent spoke members, and threaded bolt means extending through the second aperture means and threaded into the threaded aperture means in the flange for connecting each of the rim segments to the plates of two of the spoke members.

6. A spare wheel for an automobile having a rotating hub with a circumferential shoulder and a plurality of bolt fastening means thereon for connecting a wheel to the hub, the spare wheel comprising:

a number of spoke members corresponding to the number of bolt fastening means on the rotating hub, each spoke member comprising a plate having generally the shape of a sector of a circle, the plate having a reinforcing flange extending along each of the radial edges thereof corresponding to the radii of the circle, an arcuately shaped inner edge generally adjacent the apex of the sector having a radius of curvature corresponding to that of the shoulder of the rotating hub, an arcuately shaped outer edge, and aperture means in the plate adjacent the inner edge thereof for receiving one of the bolt fastening means for connecting the plate to the hub;

a number of rim segments corresponding to the number of spoke members, each rim segment comprising an arcuate band having an outer surface and an inwardly directed radial flange and an arcuately shaped body of resilient material connected to the outer surface of the arcuate band, and an inner radius of curvature corresponding to the arcuately shaped outer edge of the respective plates, each rim segment being of sufficient length that all of the rim segments together form substantially a complete, circular rim; and, means for connecting each rim segment to the arcuately shaped outer edges of two adjacent spoke members comprising threaded apertures in the radial flanges of the rib segments, apertures in the spoke members registering with the threaded apertures, and threaded bolt means passing through the apertures in the spoke members and threaded into the threaded apertures in the radial flanges.

References Cited in the file of this patent

UNITED STATES PATENTS

| | | |
|---|---|---|
| 269,255 | Biddle | Dec. 19, 1882 |
| 636,934 | White | Nov. 14, 1899 |
| 1,551,444 | Wagenhorst | Aug. 25, 1925 |
| 1,992,078 | Ludwick | Feb. 19, 1935 |
| 2,372,049 | Bailey | Mar. 20, 1945 |
| 3,019,056 | Keilman | Jan. 30, 1962 |

FOREIGN PATENTS

| | | |
|---|---|---|
| 868,404 | Germany | Feb. 26, 1953 |